May 27, 1941.  B. POLL  2,243,650

HARVESTING MACHINE

Filed May 8, 1939  3 Sheets-Sheet 1

Witness:
John S. Braddock

Inventor
Benjamin Poll
By Rice and Rice
Attorneys

May 27, 1941.　　　　B. POLL　　　　2,243,650
HARVESTING MACHINE
Filed May 8, 1939　　　3 Sheets-Sheet 2
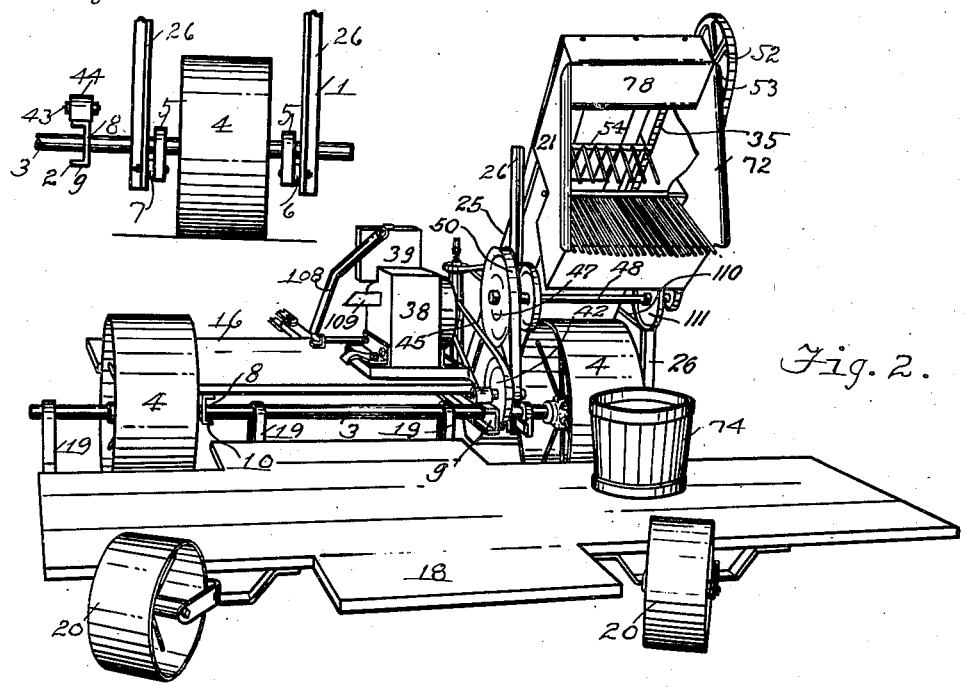
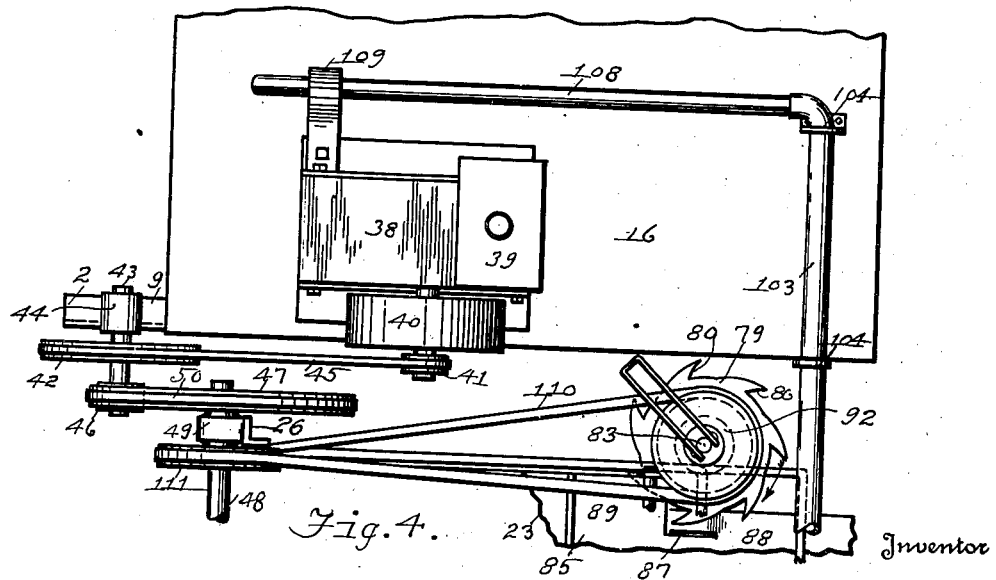
Witness:
John S. Braddock
Inventor
Benjamin Poll
By Rice and Rice
Attorneys

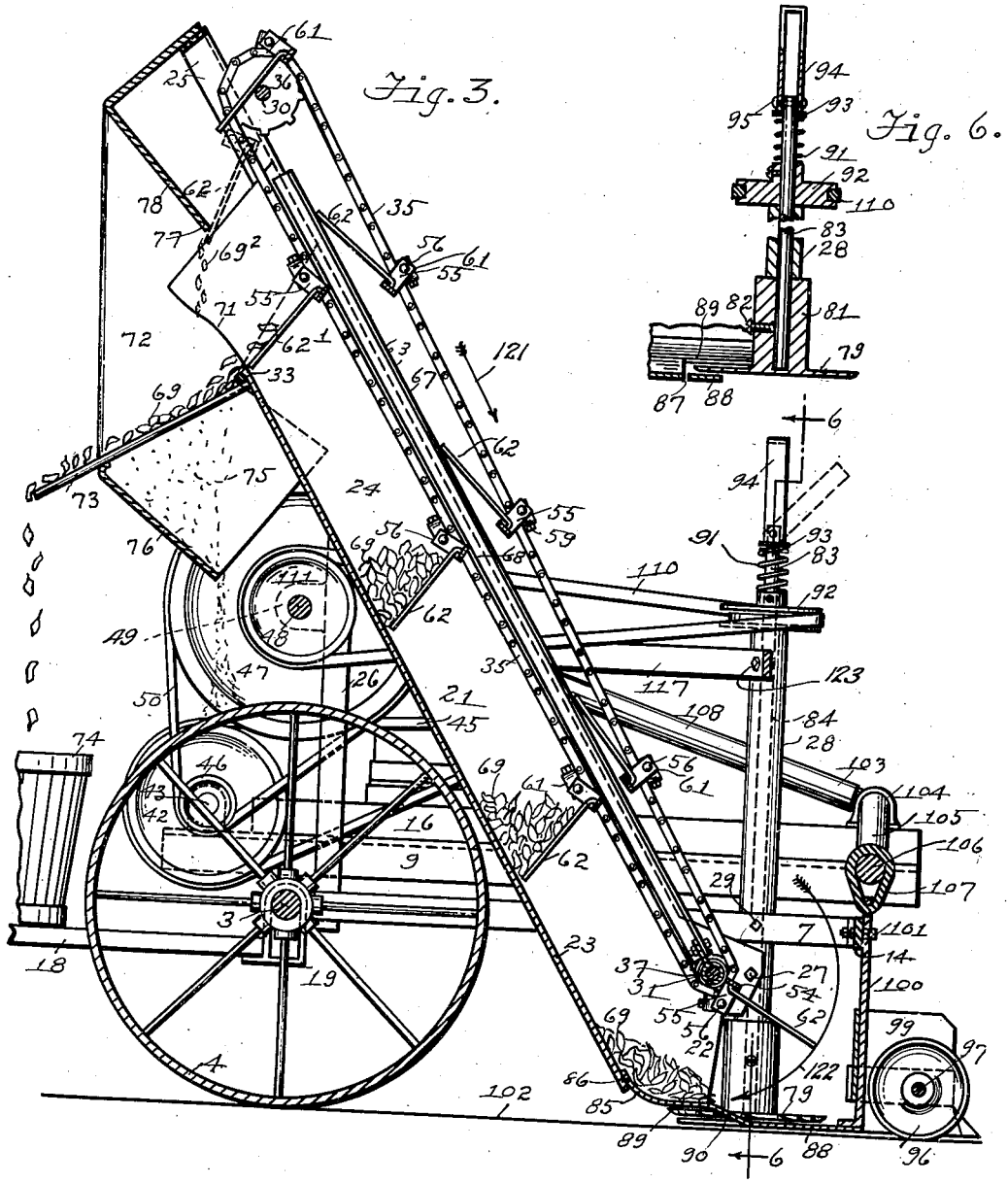

Patented May 27, 1941

2,243,650

UNITED STATES PATENT OFFICE 2,243,650

HARVESTING MACHINE

Benjamin Poll, Holland, Mich., assignor to Joseph M. Cirese, San Jose, Calif.

Application May 8, 1939, Serial No. 272,365

9 Claims. (Cl. 56—157)

The present invention relates to machines for harvesting plants such as spinach, celery and the like; and its object is to provide a harvesting machine having improved means for severing the growing plants; and further, to provide such a machine having improved means for moving the harvested plants to discharging position; and further, to provide such a machine having improved means for operating said plant-severing and plant-moving means; and further, to provide such a machine having a frame supported on a transverse axle and comprising separate frame parts relatively turnable about the axle and carrying the operating means and the means operated thereby, respectively.

This and any other objects hereinafter appearing are attained by, and the invention finds preferable embodiment in, the illustrative harvesting machine particularly described in the body of this specification and illustrated by the accompanying drawings, in which:

Figure 2 is a rearward view in perspective thereof;

Figure 3 is a right-hand side elevational view of main portions of the same, shown partially in vertical section taken on line 3—3 of Figure 1;

Figure 4 is a top plan view of middle portions thereof;

Figure 5 is a detail elevational rear view of portions of the machine;

Figure 6 is a detail vertical sectional view of portions of the machine, taken on line 6—6 of Figure 3;

Figure 1:
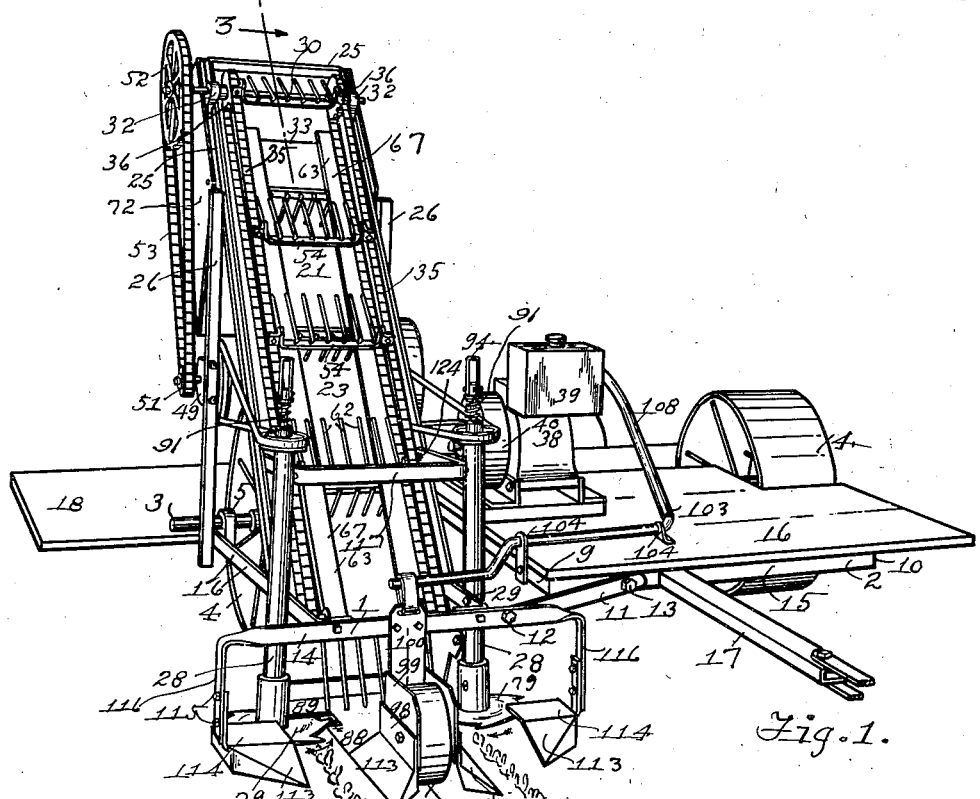
Figure 1 is a forward view in perspective of a harvesting machine embodying my invention.

The body of the harvesting machine illustrated by these drawings has a horizontal frame of bar iron or the like, comprising separate right hand and left hand parts designated generally 1, 2. The axle 3 having the supporting vehicle wheels 4 is turnably mounted adjacent its right hand end in the bearing blocks 5 fastened as by bolts indicated in Figure 5 to the forwardly extending bars 6, 7 of said right hand part 1, and medially and adjacent its left hand end the axle is journalled in the forwardly extending bars 9, 10 of the frame's left hand part 2, these parts 1, 2 being connected for short relatively turning movement about the axle by the link 11 pivoted somewhat loosely at 12, 13 on the front portions 14, 15 of the frame's said parts respectively. A forward platform 16 is carried by the frame's part 2 and is supported at its front by the vehicle's tongue 17 connected with a tractor or the like (not shown). A rearward and somewhat lower platform 18 is carried by its front straps 19 extending turnably over said axle, and by its rear caster wheels 20.

An upwardly-rearwardly inclined channel member 21 open along its lower or front end 22 and at its upper or forward side has the bottom 23 and lateral sides 24 provided with reinforcing bars 25 fastened on the outer surfaces of the sides 24 for stiffening said member and its sides. This channel member is mounted on the frame's part 1 being connected by suitable means (as by bolts not shown) to said part's laterally spaced post portions 26 and connected as by bolts 27 to the laterally spaced columns 28 which are secured by bolts 29 to said part's forwardly extending portions 6, 7.

Upper and lower parallel shafts 30, 31 are journalled respectively in bearing blocks 32 mounted on the reinforcing bars 25 above the upper end 33 of the bottom 23 of channel 21 and in bearings 34 in the forward ends of the sides 24 of the channel.

A belt conveyor comprising a pair of parallel chain belts 35 carried on the sprocket wheels 36, 37 of these shafts respectively, is driven in the direction indicated by the arrows 121, 122 by suitable power as the internal-combustion engine indicated at 38, carried on platform 16 and having the fuel tank 39 and fly wheel 40.

Speed reducing means are provided including the pulley 41 on the engine's shaft, the pulley 42 on short shaft 43 turnable in block 44 on bar 9 of the frame's part 2, the belt 45 on these pulleys, the pulley 46 on shaft 43, pulley 47 on shaft 48 turnable in block 49 of post portion 26 of the frame's part 1 and belt 50 on these pulleys, the shaft 48 and said upper shaft 30 having sprocket wheels 51, 52 carrying the sprocket chain 53. Spaced cross bars 54 have middle web portions and angularly turned ends 55 pivoted at 56 on the arms 57 of L-shaped members whose other arms 58 are fastened by screws 59 on lug portions 60 of the links 61 of the conveyor's chains 35. The cross bars 54 have rearwardly extending wing portions. in the illustrated form of spaced fingers 62.

Angle iron guide bars 63 are supported on and connected with the channel member 21 in parallel relation therewith, by said lower shaft 31 rotatable in an opening or bearing 64 in a bar 65 fastened by bolts 66 to the forward-lower ends of the inwardly turned flanges 67 of these bars, this shaft being journalled in supporting bearings 34 in the forward ends of the sides 24 of channel member 21 which is supported by the post portions 26.

Figures 7, 8:
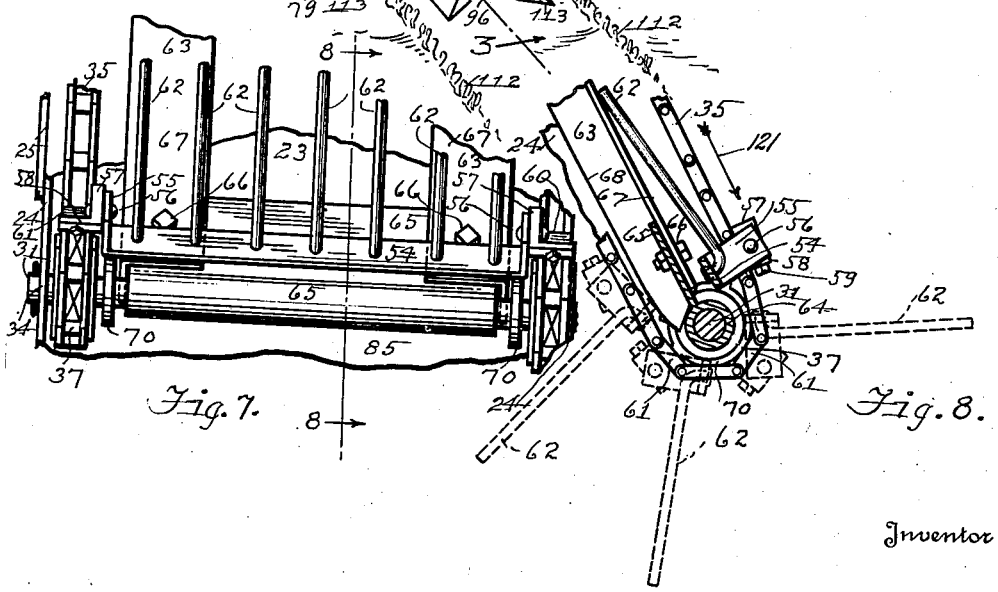
Figure 7 is a detail elevational front view (enlarged) of portions of the machine.
Figure 8 is a vertical sectinal view of said portions taken on line 8—8 of Figure 7 and showing in successive positions one set of the fingers for engaging the harvested plants.

In the forward-downward travel of the cross bars 54 they turn freely on the pivots 56 so that the free ends of some of the trailing fingers 62 slide along the upper-forward surface of the flanges 67, but in their rearward-upward travel these cross bars are turned on the pivots by their sliding contact with the inner-rearward edge 68 of said flanges so that the free ends of the fingers are held in sliding contact or in very closely spaced relation with the channel member's bottom 23 in order to engage the harvested plants 69 and slide the same upwardly-rearwardly along said bottom. In Figure 8 the same set of fingers is shown in four successive positions in their travel; in solid lines the fingers 62 are shown in their position trailing along the flange 67; in the next two (dotted line) representations of said fingers they are shown in their positions while passing over the collar portions 70 of the shaft 31; and in the last dotted line representation of these fingers this set of fingers is shown in the position wherein their free ends slide along the bottom of the channel member. As shown in this view, the curvature of the collar portions 70 causes the links 61 carrying the cross bars to assume successive angular positions relatively to the plain links connected to the opposite ends of the links 61 thus inclining said fingers in successive positions divergingly toward their free ends. Greater space between the free ends of the fingers carried by one of the links 61 and those carried by a preceding link 61 is thus provided, for more effectively picking up the harvested plants between said successive links 61, 61.

When the harvested plants 69 are carried by the fingers, the fingers' position indicated at 62¹ in Figure 3, to the upper-rearward end 33 of the bottom 23, they fall through the opening 71 in the hood 72 mounted on the upper end of the channel member and onto the inclined plate 73 along which they slide and drop into a suitable container 74 on the rear platform 18; any dirt or dust 75 falling between the fingers onto the forwardly-downwardly inclined bottom 76 of the hood whence the same is discharged in front of the container. Any plants which may remain on the fingers are scraped therefrom by the edge 77 of the hood's bottom portion 78 engaging the fingers as indicated near the upper end of the channel member, and fall on the plate 73, these fingers having passed out of contact with the bars 63 and being thus inclined by the edge 77 farther rearwardly as shown.

A pair of cutters above the ground for severing the growing plants are provided, each comprising the disk 79 having cutting teeth 80 and a collar portion 81 receiving, and secured by screws 82 to, a vertical shaft 83 rotatable in bearings 84 in one of the aforesaid columns 28. A forwardly extending lip 85 is fastened at 86 on the forward-lower end of the channel member's bottom 23 and is split at 87 to provide lower and upper portions 88, 89 between which the teeth 80 pass in the disk's rotation shearingly along the inclined portion 90 of said lip.

A coiled spring 91, pressing between the pulley 92 on the vertical shaft 83 and the washer 93 on which the cam inner end of a lever handle 94 is pivoted at 95 on the shaft bears, urges this shaft upwardly in its bearing. This handle may be turned horizontally back and forth rather suddenly for dislodging hard accumulations from the disk and its teeth.

A roller 96, pivoted at 97 in the side plates 98 of a mounting 99 carried by its upright 100 secured by bolts 101 on the forward bar 14, may be raised from the position seen in Figure 3 wherein the roller travels on the ground 102 and supports the lip 85 above it, by the lever 103 fulcrumed at 104 on the frame's part 2. The frame's part 1 and all the structure carried thereby may thus be raised turnably about the axle 3. This lever has a short arm 105 with wrist portion 106 over which extends the strap 107 of the upright 100. The long arm 108 of this lever is springable to permit flexing into and out of held engagement with the keeper 109 on the engine 38. The vertical shafts 83 are rotated by the belts 110 on their pulleys 92 and the pulleys 111 on the shaft 48.

It will be seen that, when the frame's part 1 is raised, the belt 50 is loosened thus stopping the operation of the cutters.

As shown in Figure 1 the rows 112 of growing plants are straddled by the downwardly inclined portions 113 of the plates 98 and of the members 114 fastened by screws 115 on the downwardly extending end portions 116 of the front bar 14, these inclined portions 113 serving to raise any low lying plants into proper position to be severed by the cutters.

As shown, the channel member 21 is additionally supported or stiffened on the frame's part 1 by the bar 117 fastened as by bolts to the sides 24 of said member as indicated at 124 in Figure 1 and as by bolts 123 to the columns 28 as indicated in Figure 3.

The invention being intended to be pointed out in the claims, is not to be limited to or by details of construction and arrangement of the particular embodiment thereof illustrated by the drawings or hereinbefore described.

I claim:

1. In a plant harvesting machine of the class described: a vehicle having a channel member extending rearwardly from the inlet end thereof and provided with a pair of guide bars at its respective sides, extending parallel with said member's bottom; a pair of belts travelled parallelly with the bottom; spaced cross bars having middle web portions and transversely extending end portions pivotally mounted adjacent their free ends on the belts respectively and having also wing portions carried by the web portions and extending toward said bottom in their operative rearward movement for engaging and moving the harvested plants therealong, the cross bars being turnable rearwardly by their engagement with the harvested plants to positions wherein the cross bars engage the guide bars rearwardly of said pivotal mounting for holding their wing portions transversely of the channel member in their operative rearward movement; and means adjacent said inlet end for severing the growing plants.

2. In a plant harvesting machine of the class described: a vehicle having a channel member extending rearwardly from the inlet end thereof and provided with a pair of guide bars at its respective sides, extending parallel with said member's bottom; a pair of belts travelled parallelly with the bottom; spaced cross bars having middle web portions and transversely extending end portions pivotally mounted adjacent their free ends on the belts respectively and having also wing portions carried by the web portions and extending toward said bottom in their operative rearward movement for engaging and moving the harvested plants therealong, the cross bars being turnable rearwardly by their engagement with the harvested plants to positions wherein the cross bars engage the guide bars rearwardly of said pivotal mounting for holding their wing portions transversely of the channel member in their operative rearward movement; said member having a transversely extending bottom portion spaced rearwardly from the guide bars and upwardly from said bottom adapted to be engaged by the wing portions at the end of their operative movement for turning them rearwardly and stripping the harvested plants from the wing portions and discharging said plants from the channel member; and means at said inlet end for severing the growing plants, comprising a shearing blade in fixed relation with said inlet end and a rotatable disk member cooperating with said fixed member.

3. In a plant harvesting machine of the class described: a vehicle having a channel member extending rearwardly from the inlet end thereof and provided with a pair of guide bars at its respective sides, extending parallel with said member's bottom; front and rear wheels adjacent the ends of said member; a pair of laterally spaced chain belts travelled on the wheels parallelly with the bottom; spaced cross bars having middle web portions and transversely extending end portions pivotally mounted adjacent their free ends on links of the chains respectively and having also wing portions carried by the web portions and extending toward said bottom in their operative rearward movement for engaging and moving the harvested plants therealong, the cross bars being turnable rearwardly by their engagement with the harvested plants to positions wherein the cross bars engage the guide bars rearwardly of said pivotal mounting for holding their wing portions transversely of the channel member in their operative rearward movement, and said links being turnable in passing over the front wheels by the circumferential peripheries thereof to positions wherein the wing portions are directed radially of said wheels for increasing the space between their free ends and the free ends of the wing portions of preceding cross bars in said member; and means adjacent said inlet end for severing the growing plants.

4. In a plant harvesting machine of the class described: a vehicle having a channel member extending rearwardly from the inlet end thereof and provided with a pair of guide bars at its respective sides extending parallel with said member's bottom; front and rear wheels adjacent the ends of said member; a pair of belts travelled on the wheels parallelly with the bottom; spaced cross bars having middle web portions and transversely extending end portions pivotally mounted adjacent their free ends on the belts respectively and wing portions extending toward the bottom in their operative rearward movement for engaging and moving the harvested plants therealong, the cross bars being turnable rearwardly in their operative movement by their engagement with said plants to positions wherein the cross bars engage the guide bars rearwardly of said pivotal mounting; and means adjacent said inlet end for severing the growing plants, comprising horizontally rotatable cutting disks.

5. In a plant harvesting machine of the class described: a vehicle having a channel member extending rearwardly from the inlet end thereof and provided with a pair of guide bars at its respective sides extending parallel with said member's bottom; front and rear wheels adjacent the ends of said member; a pair of belts travelled on the wheels parallelly with the bottom; spaced cross bars having middle web positions and transversely extending end portions pivotally mounted adjacent their free ends on the belts respectively and wing portions extending toward the bottom in their operative rearward movement for engaging and moving the harvested plants therealong, the cross bars being turnable rearwardly in their operative movement by their engagement with said plants to positions wherein the cross bars engage the guide bars rearwardly of said pivotal mounting, said bottom having at its front end a forwardly extending lip split to form vertically spaced portions; and means adjacent said inlet end for severing the growing plants, comprising cutting disks rotatable horizontally between said spaced portions.

6. In a plant harvesting machine of the class described: a vehicle having a transverse axle with vehicle wheels adjacent its ends; a frame comprising separate parts relatively turnable about the axle; a rearwardly extending channel member mounted on one of said parts and having means for moving harvested plants therealong; means mounted on said part adjacent the inlet front end of said member for severing the growing plants; means mounted on the other part of the frame for operating said means for moving the harvested plants and said means for severing the growing plants, and connections between the operating means and said means operated thereby.

7. In a plant harvesting machine of the class described: a vehicle having a transverse axle with vehicle wheels adjacent its ends; a frame comprising separate parts relatively turnable about the axle; a rearwardly extending channel member mounted on one of said parts and having means for moving harvested plants therealong; means mounted on said part adjacent the inlet front end of said member for severing the growing plants; means mounted on the other part of the frame for operating said means for moving the harvested plants and said means for severing the growing plants, and connections between the operating means and said means operated thereby; and a trailing rear platform connected with the axle for vertical turning movement thereon.

8. In a plant harvesting machine of the class described: a vehicle having an axle with vehicle wheels adjacent its ends; a frame comprising separate parts relatively turnable about the axle; a rearwardly extending channel member mounted on one of said parts and provided with a pair of guide bars at its respective sides extending parallelly with the bottom of said member; a pair of chain belts at the sides respectively of said member travelled parallelly with said bottom on forward and rearward pairs of wheels; spaced cross bars having middle web portions and transversely extending end portions pivotally mounted adjacent their free ends on links of the belts respectively and wing portions carried by the web portions extending toward said bottom in their rearward operative movement for engaging the growing plants and moving the harvested plants into the inlet forward end of said member and rearwardly therealong, the cross bars being turnable rearwardly on their pivotal mountings to positions wherein the cross bars engage the guide bars for holding the wing portions in their operative positions transversely of the channel member, said links in passing over the forward wheels being turnable by the circumferential peripheries thereof to positions wherein the wing portions extend radially for increasing the space between the free ends of the wing portions in thus passing over the forward wheels; means for severing the growing plants mounted on said part of the frame at the inlet forward end of the channel member, comprising a forwardly extending lip of the bottom of said member having vertically spaced horizontal portions, and a cutting disk rotatably extending between said spaced portions and having an upwardly extending shaft; means mounted on the other part of the frame for driving the chain belts and the cutting disk, with connections between the driving means and the parts driven thereby.

9. In a plant harvesting machine of the class described: a vehicle having an axle with vehicle wheels adjacent its ends; a frame comprising separate parts relatively turnable about the axle; a rearwardly extending channel member mounted on one of said parts and provided with a pair of guide bars at its respective sides extending parallelly with the bottom of said member; a pair of chain belts at the sides respectively of said member travelled parallelly with said bottom on forward and rearward pairs of wheels; spaced cross bars having middle web portions and transversely extending end portions pivotally mounted adjacent their free ends on links of the belts respectively and wing portions carried by the web portions extending toward said bottom in their rearward operative movement for engaging the growing plants and moving the harvested plants into the inlet forward end of said member and rearwardly therealong, the cross bars being turnable rearwardly on their pivotal mountings to positions wherein the cross bars engage the guide bars for holding the wing portions in their operative positions transversely of the channel member, said links in passing over the forward wheels being turnable by the circumferential peripheries thereof to positions wherein the wing portions extend radially for increasing the space between the free ends of the wing portions in thus passing over the forward wheels; means for severing the growing plants mounted on said part of the frame at the inlet forward end of the channel member, comprising a forwardly extending lip of the bottom of said member having vertically spaced horizontal portions, and a cutting disk rotatably extending between said spaced portions and having an axially movable upwardly extending shaft; means mounted on the other part of the frame for driving the chain belts and the cutting disk, with connections between the driving means and the parts driven thereby; and manually operated means for moving said shaft axially and turnably for dislodging accumulations from the severing means.

BENJAMIN POLL.